United States Patent

Davignon et al.

[11] Patent Number: 5,836,053
[45] Date of Patent: Nov. 17, 1998

[54] CABLE TIE

[75] Inventors: Paul A. Davignon, Uxbridge, Mass.;
Richard M. Bastien, Cumberland, R.I.;
James C. Benoit, Needham, Mass.

[73] Assignee: Avery Dennison Corporation, Pasadena, Calif.

[21] Appl. No.: 722,409

[22] Filed: Oct. 1, 1996

[51] Int. Cl.⁶ .................. F16L 3/08; E05B 75/00
[52] U.S. Cl. .......... 24/16 PB; 24/16 R; 24/17 AP; 24/30.5 P
[58] Field of Search ............... 24/16 PB, 16 R, 24/17 AP, 30.5 P, 30.5 R, 484; 248/74.3

[56] References Cited

U.S. PATENT DOCUMENTS

| | | | |
|---|---|---|---|
| 3,537,146 | 11/1970 | Caveney | 24/16 PB |
| 3,590,442 | 7/1971 | Geisinger | 24/16 PB |
| 3,717,906 | 2/1973 | Wells | 24/16 PB |
| 3,766,608 | 10/1973 | Fay | 24/30.5 P |
| 4,001,898 | 1/1977 | Caveney | 24/16 PB |
| 4,137,606 | 2/1979 | Wood | 24/16 PB |
| 4,214,349 | 7/1980 | Munch | 24/16 PB |
| 4,223,424 | 9/1980 | Burnett | 24/30.5 R |
| 4,473,524 | 9/1984 | Paradis | 24/16 PB |
| 4,501,354 | 2/1985 | Hoffman | 24/16 PB |
| 4,580,319 | 4/1986 | Paradis | 24/16 PB |
| 4,754,529 | 7/1988 | Paradis | 24/16 PB |
| 4,766,651 | 8/1988 | Kobayashi et al. | 24/16 PB |
| 4,866,816 | 9/1989 | Caveney | 24/16 PB |
| 5,031,943 | 7/1991 | Scott et al. | 24/16 PB |
| 5,389,330 | 2/1995 | Sorensen et al. | 24/16 PB |

*Primary Examiner*—James R. Brittain
*Assistant Examiner*—Robert J. Sandy
*Attorney, Agent, or Firm*—Kriegsman & Kriegsman

[57] ABSTRACT

A one piece cable tie for forming a plurality of objects such as cables into a bundle includes an elongated flexible strap having a top planar surface, a bottom planar surface, a first end and a second end. The strap further includes a plurality of transverse raised cross-members projecting up from the top planar surface, said raised cross-members being spaced along the length of the strap and defining therebetween a plurality of openings. A locking head is integrally formed to the first end of the strap. The locking head includes an outer end wall, an inner end wall and a pair of sidewalls which together define a generally rectangularly shaped strap accepting channel therebetween. A holding tab is disposed within the locking head and projects out from the inner end wall and into the strap accepting channel. The outer end wall is shaped to include an angled locking face. In use, after the second end of the strap has been inserted through the strap accepting channel and drawn tight around a bundle and the insertion force is thereafter relaxed, the stored pressure of the bundle by virtue of its configuration pivots said strap causing the rear surface of one of the raised ratchet teeth to abut against the angled locking face to lock the strap in place. At the same time, the holding tab engages with one of the openings in the strap to oppose deliberate release of the raised ratchet tooth from the locking face.

10 Claims, 3 Drawing Sheets

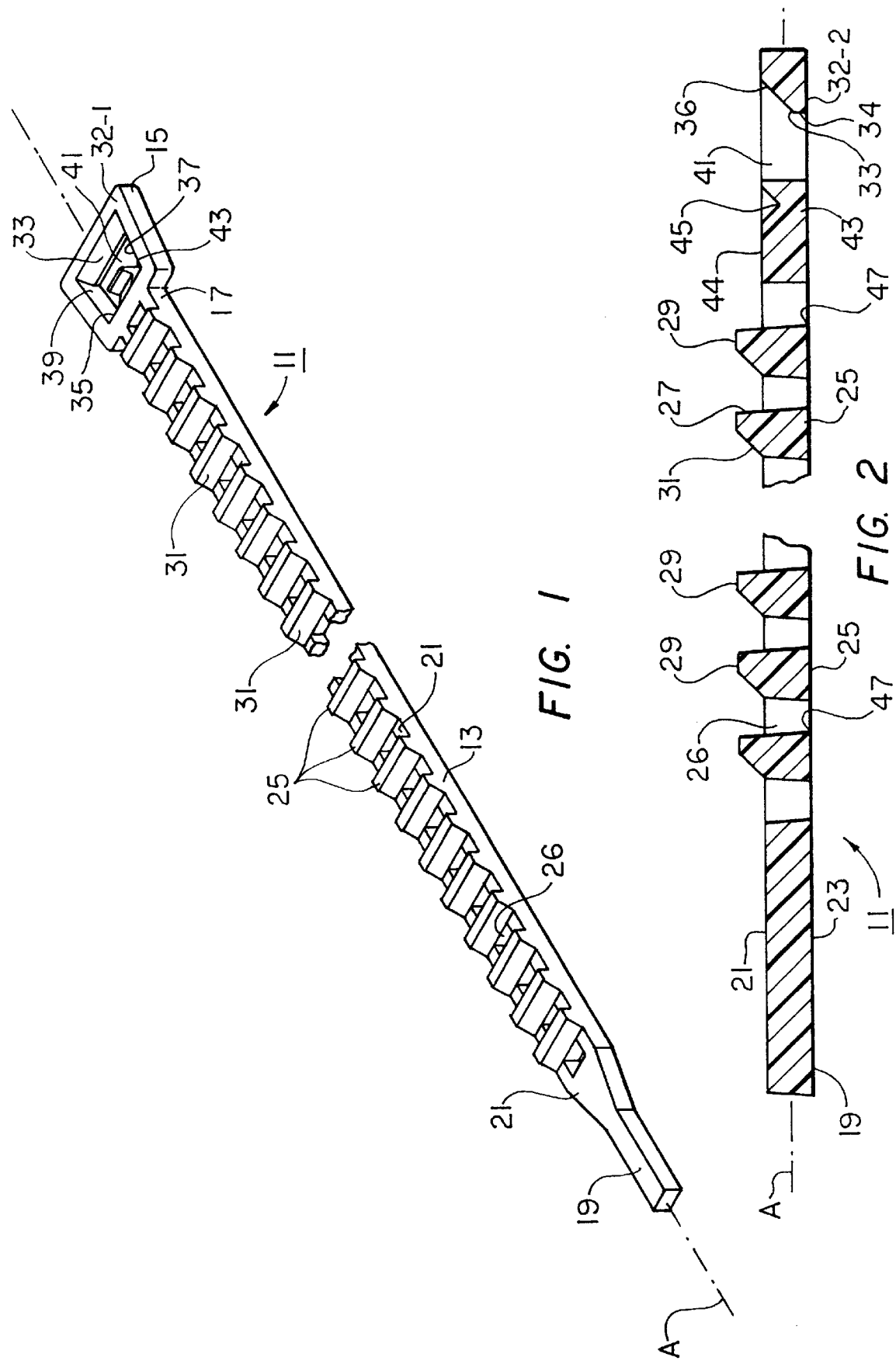

CABLE TIE

BACKGROUND OF THE INVENTION

The present invention relates to cable ties.

Cable ties, also known as harnessing devices, are well known in the art and are commonly used for bundling objects.

In U.S. Pat. No. 4,866,816 to J. E. Caveney there is disclosed a flexible one-piece cable tie for harnessing a bundle of wires or the like, the cable tie including an elongated, flexible strap having a ladder structure comprising a plurality of spaced rung-like members with intermediate openings for receiving a locking pawl, the locking pawl being disposed within an enclosed head integral with the strap at one end thereof.

In U.S. Pat. No. 4,766,651 to S. Kobayashi et al there is disclosed a band clamp for bundling cables in an automobile. The band clamp has a body with a band extending from one end thereof and a band receiving aperture from another end. In the lower side, the band has a plurality of grooves laterally extending while a locking pawl is formed in the inner wall of the band receiving slot for engagement with one of the grooves. The band clamp further has a pair of upstanding walls having a V-shaped cuts on their top surfaces. Cables C placed on the body across the V-shaped cuts is subjected to a positive clamping power in the V-shaped cuts.

In U.S. Pat. No. 4,754,529 to J. R. Paradis there is disclosed a harnessing device for bundling objects, the device comprising a locking head and a strap with teeth that are controlled by stretching. The locking head contains a pawl or tang that engages the teeth of the strap by wedging. One or more wedging teeth are desirably located on the locking tang as well. A further tooth to promote locking is desirably included in the locking head. The strap is advantageously molded of stretch reorientable material which is subsequently stretched to control the profile of the teeth which are engaged by the locking tang and head. The teeth are spaced on the strap to permit use of the teeth near the head for the harnessing of small bundles. The pawl is provided with specified pivot points for both the insertion and loading of the strap in the head.

In U.S. Pat. No. 4,223,424 to R. G. Burnett there is disclosed a sealing device for a receptacle such as a heavy cloth bank bag for containing money or currency in which a single strip or band of material formed of metal or plastic is stamped with projections or serrations extending from one side of the band and wherein a pair of locking projections in the form of raised panels are stamped in the material near one end of the band, so that the other flat end thereof may be inserted through slits formed by the stamped panels, whereby one or preferably more of the serrations are engaged and locked by the edges of the panels when the strip is tightened around the neck of the bag. Movement of the ends of the strips are thereby prevented in a direction which would unlock the seal but is freely permitted in the other direction for the extent of the serrations so that a tight seal may be accomplished. The material adjacent the locking panels is provided with sets of inwardly extending teeth at the top and bottom thereof to engage the material of the bag when the sealing device is in place and is tightened, so that the sealing device may not be removed from the bag without tearing or destroying the same and thus immediately provided evidence of tampering or attempted pilferage.

In U.S. Pat. No. 3,766,608 to R. B. Fay there is disclosed a harnessing device formed by a locking head and an attached, apertured strap. The head contains a longitudinal guide channel for receiving the strap, after encirclement of items to be harnessed, and an internal locking tang. The latter is deflected with respect to relatively narrow auxiliary channels on opposite sides of the guide channel. One of the auxiliary channels receives the locking tang during the harnessing of the items; the other auxiliary channel contains a stop against which the locking tang becomes abutted in planar engagement by the reverse thrust of the harnessed items.

In U.S. Pat. No. 3,590,442 To G. H. Geisinger there is disclosed a bundling strap for looping about articles, comprised of an elongated, flexible, serrated body integral with and extending from an apertured head and terminating in a tail extension. One end of a dual-ended, obliquely angled, unidirectional locking means is hingedly coupled within a first transverse aperture in the head and is integral therewith, being adapted to lockingly engage the serrations on the elongated body inserted within a second transverse aperture in the head proportioned to conveniently receive the body therein, said locking means thereby preventing the attempted withdrawal of the body from the apertured head.

In U.S. Pat. No. 3,537,146 to J. E. Caveney there is disclosed an integral one-piece cable tie to be tensioned about a bundle of wires, the cable tie including an elongated flexible strap having a frame integral with one end thereof, the frame having a pair of longitudinally extending side walls and an end wall and having a strap-receiving opening therethrough, a row of teeth on one surface of the strap, a pawl hingedly mounted on the frame and extending into the strap-receiving opening, the end wall having a strap-bearing surface disposed toward the pawl and the pawl having a strap-engaging surface disposed toward the end wall, and a set of teeth disposed on the strap-engaging surface and shaped complementary to the row of teeth on the strap.

In U.S. Pat. No. 3,102,311 to H. B. Marten there is disclosed a unitary plastic bundling strap adapted to be looped upon itself in adjustable self-locking relation comprising a tail-end portion, a body portion, an enlarged head-end portion having a rectangular opening therein, a pair of rigid wedge-like members integral with said head-end portion and disposed oppositely of each other and within said opening, each of said members having one side edge in a common plane running transverse to the opening, a flexible pawl integral with said head-end portion and disposed within said opening in spaced diametrically opposite relation and centrally between said wedge-like members, and a row of ratchet teeth formed on and extending length-wise of the opposite faces of said body portion in staggered relation, said wedge-like members and said flexible pawl being spaced apart a distance not greater than the thickness of the toothed body portion, whereby the body portion is adapted to be secured about a bundle of articles by passing the tail-end portion through the rectangular opening and drawing the same so that the ratchet teeth freely pass between the flexible pawl and the wedge-like members until the strap is taut, wherein the outer of said wedge-like members and the flexible pawl will engage opposite ratchet teeth on the body portion preventing rearward movement of said body portion.

SUMMARY OF THE INVENTION

It is an object of this invention to provide a new and improved cable tie.

It is another object of this invention to provide a one-piece cable tie.

It is yet another object of this invention to provide a cable tie as described above which provides for the secure bundling of objects.

It is still another object of this invention to provide a cable tie as described above which has a minimum number of parts, is simple in construction and is easy to use.

It is further another object of this invention to provide a cable tie as described above which has a low profile.

It is still another object of this invention to provide a cable tie as described above which has a strap having a ladder structure.

Accordingly, there is provided a one piece cable tie for forming a plurality of objects such as cables into a bundle, said cable tie comprising an elongated flexible strap having a top planar surface, a bottom planar surface, a first end and a second end, said strap having a plurality of raised cross-members spaced along its length which define therebetween a plurality of openings, a locking head integrally formed to the first end of said strap, said locking head having a top surface and a bottom surface and including a strap accepting channel having an inner end wall and an outer end wall, and a holding tab disposed within said locking head and projecting out from one of said end walls into said strap accepting channel for cooperation with one of said openings in said strap, said other end wall being shaped to include an angled locking face for cooperation with one of said raised cross-members, whereby after the second end of said strap has been inserted through said strap accepting channel and drawn tight around a bundle and the insertion force is thereafter relaxed, the stored pressure of the bundle by virtue of its configuration pivots said strap causing one of the raised cross-members to abut against the angled locking face to lock the strap in place and causing the holding tab to engage with one of said openings in the strap to oppose deliberate release of the cross-member from the locking face.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 1 is a perspective view taken from the top of a cable tie constructed according the teachings of the present invention;

FIG. 2 is a side section view of the cable tie shown in FIG. 1;

DETAILED DESCRIPTION OF THE PREFERRED EMBODIMENT

Figure 3:
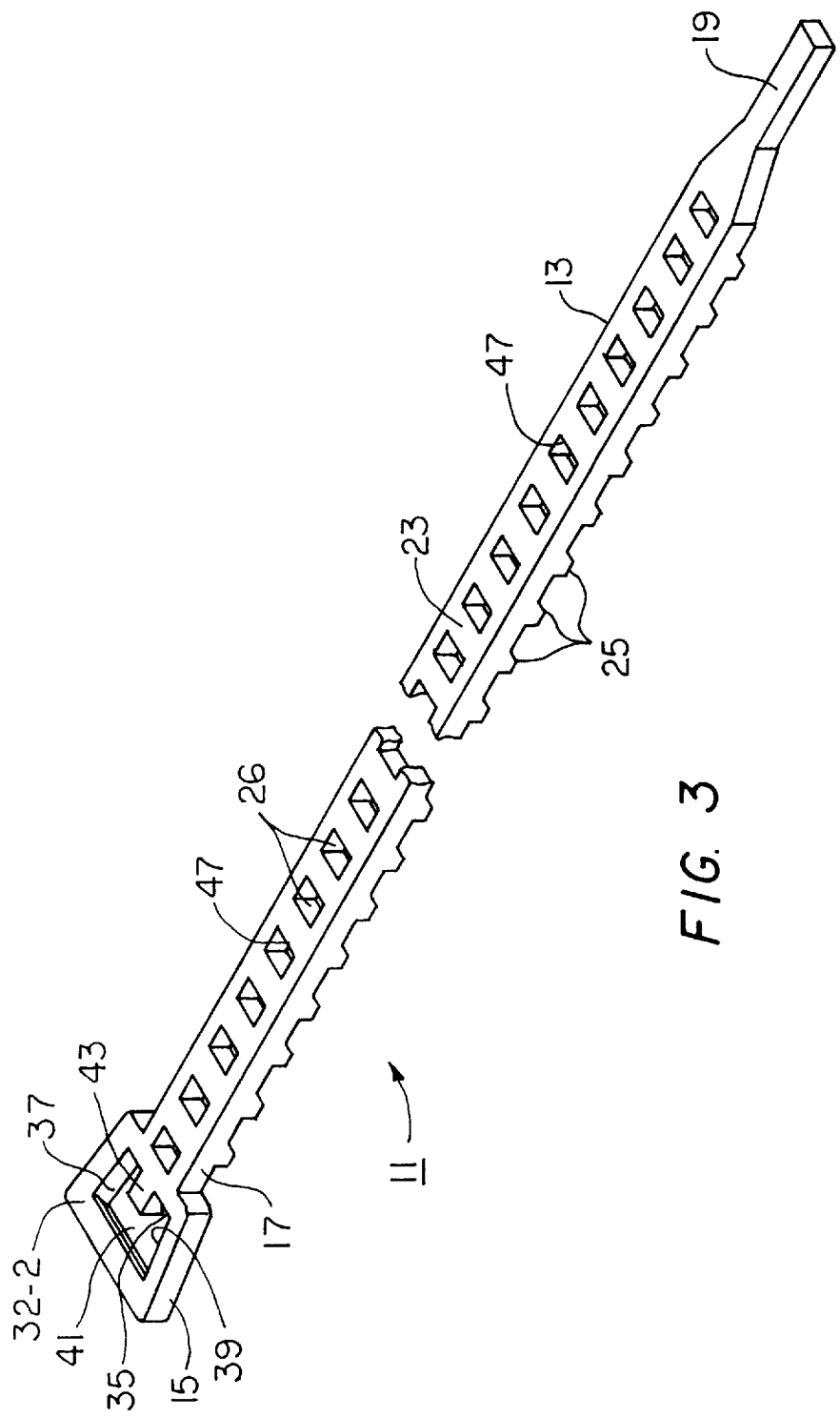
FIG. 3 is a perspective view taken from the bottom of the cable tie shown in FIG. 1.
Figure 4:
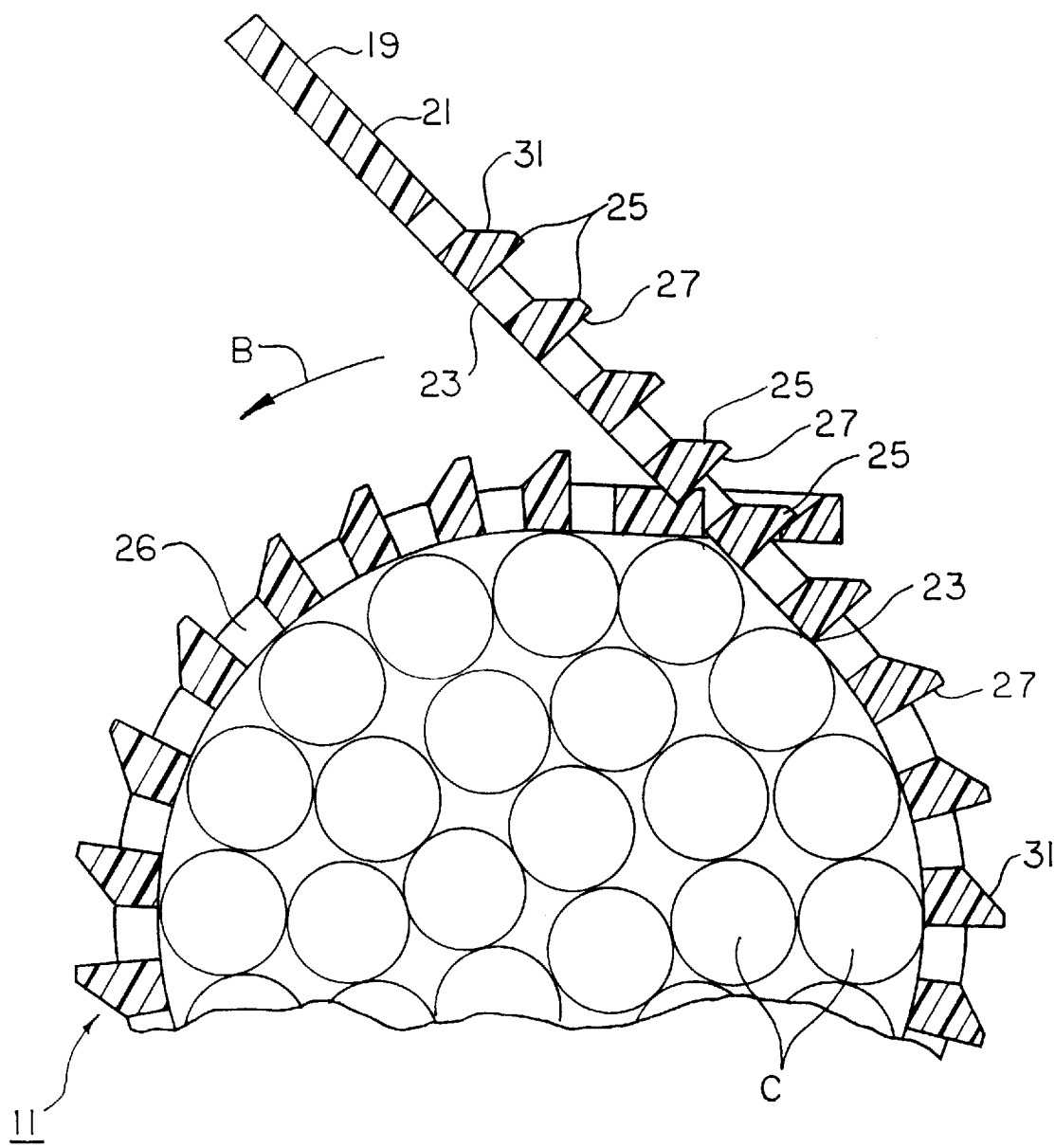
FIG. 4 is a side section view of the cable tie shown in FIG. 1, the tie being shown in a loop wrapped around a bundle of cables.

Referring now to the drawings, there are shown in FIGS. 1–4 a cable tie constructed according to the teachings of the present invention, the cable tie being identified by reference numeral 11. As shown in FIG. 4, cable tie 11 can be used to bundle together a plurality of cables C; however, it is to be understood that the invention is not exclusively limited to bundling cables, but rather may be used to bundle together other objects.

Cable tie 11 is a one piece tie comprising an elongated strap 13 and a locking head 15.

Elongated strap 13 is constructed of a flexible material such as plastic, nylon or a high modulus elastomer and includes a first end 17, a second end 19, a top planar surface 21 and a bottom planar surface 23.

Strap 13 further includes a plurality of raised cross-members 25 which extend transversely across strap 13 and which protrude above top planar surface 21 of strap 13. Raised cross-members 25 are spaced along the length of strap 13 and define therebetween a plurality of openings 26. It should be understood that openings 26 need not go completely through strap 13 but could, if desired, extend only partially up into the body of strap 13 from bottom surface 23.

Each cross-member 25 is in the form of a ratchet shaped tooth and comprises a rear surface 27 normal to the longitudinal axis A of strap 13, a top flat surface 29 approximately parallel to top surface 21 and a front surface 31 which angles upwardly and rearwardly at an angle of about 45 degrees from the longitudinal axis A of strap 13.

Locking head 15 is integrally formed to first end 17 of elongated strap 13. Locking head 15 comprises a top surface 32-1, a bottom surface 32-2, an outer end wall 33, an inner end wall 35, a first sidewall 37 and a second sidewall 39 which together define a four sided, generally rectangularly shaped strap accepting channel 41 therebetween. Outer end wall 33 includes a bottom portion 34 that extends up vertically from bottom surface 32-2 and a top portion 36 that is angled downward and inward and serves as an angled locking face. Angled locking face 36 cooperates with rear surface 27 of one of teeth 25 to lock strap 13 in place as will hereinafter be explained.

Cable tie 11 further comprises a rigid holding tab 43 disposed within locking head 15. Holding tab 43 projects out from inner end wall 35 into strap accepting channel 39 in the direction of outer end wall 33. Holding tab 43 is shaped to include a top surface 44 having a V-shaped lateral groove 45.

Tie 11 may be used to secure a plurality of cables C as a bundle in the following manner as shown in FIG. 4. Second end 19 of strap 13 is wrapped around cables C and is inserted through strap accepting channel 41 to form a loop. Second end 19 is further advanced through strap accepting channel 41 to reduce the size of the loop, drawing tie 11 tight around the bundle of cables C. As the insertion force of second end 19 is relaxed, the stored pressure of the bundle by virtue of its configuration pushes against bottom surface 23 causing strap 13 to pivot. As strap 13 pivots, rear surface 27 of one of raised cross-members 25 abuts against angled locking face 36 to lock tie 11 in place around the bundle. At the same time, holding tab 43 projects at least partially into the opening 26 directly in front of the particular cross-member 25 abutting against locking face 36 with bottom edge 47 of opening 26 seated in groove 45.

As can be appreciated with edge 47 of opening 26 seated in groove 45, strap 13 cannot be rotated in a counterclockwise direction, i.e. direction B in FIG. 4, to lift cross-member 25 off of locking face 36. Thus, tab 43 cooperates with an opening 26 to oppose deliberate release of strap 13 from head 15.

As can be seen in the Figures, tie 11 is a low profile tie in that top surface 32-1 of head 15 does not project above the top of cross-member 25 and bottom surface 32-2 of head 15 does not project below surface 23 of strap 13. In fact, top and bottom surfaces 32-1 and 32-2, respectively, of head 15 are coplanar with the top and bottom surfaces, respectively, of strap 13.

The embodiment shown in the present invention is intended to be merely exemplary and those skilled in the art shall be able to make numerous variations and modifications to it without departing from the spirit of the present invention. For example, tops of cross-members 25 could be pointed rather than flat. All such variations and modifications are intended to be within the scope of the present invention as defined in the appended claims.

What is claimed is:

1. A one piece cable tie for forming a plurality of objects such as cables into a bundle, said cable tie comprising:
    (a). an elongated flexible strap having a top planar surface, a bottom planar surface, a first end and a second end, said strap having a plurality of raised cross-members spaced along its length which define therebetween a plurality of openings, each opening having a bottom edge,
    (b). a locking head integrally formed to the first end of said strap, said locking head having a top surface and a bottom surface and including an inner end wall, an outer end wall and a pair of sidewalls which together define a strap accepting channel, and
    (c). a holding tab disposed within said locking head, said holding tab projecting out from one of said end walls into said strap accepting channel for cooperation with one of said openings in said strap,
    (d). said other end wall being generally in the shape of an angled locking face for cooperation with one of said raised cross-members, said angled locking face extending from one sidewall to the other sidewall and inwardly and downwardly from the top surface of said locking head,
    (e). whereby after the second end of said strap has been inserted through said strap accepting channel and drawn tight around a bundle and the insertion force is thereafter relaxed, the stored pressure of the bundle by virtue of its configuration pivots said strap causing one of the raised cross-members to abut against the angled locking face to lock the strap in place and causing the holding tab to engage one of said openings in the strap to oppose deliberate release of the cross-member from the locking face.

2. The cable tie as claimed in claim 1 wherein said raised cross-members project up from the top planar surface of said strap.

3. The cable tie as claimed in claim 2 wherein said raised cross-members are in the shape of teeth.

4. The cable tie as claimed in claim 3 wherein the teeth are ratchet shaped.

5. The cable tie as claimed in claim 2 wherein said holding tab projects out from said inner end wall of said strap accepting channel.

6. A one piece cable tie for forming a plurality of objects such as cables into a bundle, said cable tie comprising:
    (a). an elongated flexible strap having a top planar surface, a bottom planar surface, a first end and a second end, said strap having a plurality of raised cross-members spaced along its length which define therebetween a plurality of openings, each opening having a bottom edge, the raised cross members being in the shape of ratchet shaped teeth which project up from the top planar surface of said strap,
    (b). a locking head integrally formed to the first end of said strap, said locking head having a top surface and a bottom surface and including an inner end wall, an outer end wall and a pair of sidewalls which together define a strap accepting channel, and
    (c). a holding tab disposed within said locking head and projecting out from the inner end wall and into said strap accepting channel for cooperation with one of said openings in said strap, said holding tab including a transverse groove,
    (d). the outer end wall being generally in the shape of an angled locking face for cooperation with one of said raised cross-members, the angled locking face sloping downwardly and inwardly,
    (e). whereby after the second end of said strap has been inserted through said strap accepting channel and drawn tight around a bundle and the insertion force is thereafter relaxed, the stored pressure of the bundle by virtue of its configuration pivots said strap causing one of the raised cross-members to abut against the angled locking face to lock the strap in place and causing the holding tab to extend into and engage one of said openings in the strap to oppose deliberate release of the cross-member from the locking face, the transverse groove receiving the bottom edge of one of said plurality of openings when said holding tab extends into and engages the opening.

7. The cable tie as claimed in claim 6 wherein the raised cross-members project upward from the top planar surface of said strap and above the top surface of the head.

8. The cable tie as claimed in claim 7 wherein said cross-members extend transversely across said strap.

9. The cable tie as claimed in claim 8 wherein said strap accepting channel further includes a pair of side walls.

10. The cable tie as claimed in claim 9 wherein said holding tab is rigid.

* * * * *